United States Patent [19]
Taniguchi et al.

[11] 3,813,919
[45] June 4, 1974

[54] TESTING APPARATUS FOR MEASURING THERMAL BEHAVIORS OF FILAMENT YARN

[75] Inventors: Motoji Taniguchi, Osaka; Shigeo Kitamura, Kobe; Kazutomo Ishizawa; Murao Miyazaki, both of Osaka, all of Japan

[73] Assignee: Kanegafuchi Boseki Kabushiki Kaisha, Tokyo, Japan

[22] Filed: Dec. 27, 1971

[21] Appl. No.: 212,106

[30] Foreign Application Priority Data
Dec. 28, 1970 Japan.............................. 45-127851

[52] U.S. Cl. ...................................... 73/15.6, 73/93
[51] Int. Cl. ............................................. G01n 3/18
[58] Field of Search ............ 73/15.6, 95.5, 160, 90, 73/93, 11

[56] References Cited
UNITED STATES PATENTS

| | | | |
|---|---|---|---|
| 2,518,217 | 8/1950 | Beck | 73/15.6 |
| 2,660,881 | 12/1953 | De Grift | 73/15.6 |
| 2,763,149 | 9/1956 | Long et al. | 73/15.6 |
| 3,135,106 | 6/1964 | Lazan | 73/15.6 |
| 3,196,670 | 7/1965 | Lander, Jr. | 73/15.6 |
| 3,369,390 | 2/1968 | Chu et al. | 73/15.6 |
| 3,521,477 | 7/1970 | Dollet | 73/15.6 |
| 3,550,440 | 12/1970 | Siron et al. | 73/90 |

OTHER PUBLICATIONS
Fee et al., "Instrument For Measuring Thermal and Elastic Behavior of Hide and Modified Hide Materials" in Journal of American Leather Chemists Assoc. Vol. 11, pg. 530–541 No. 10 Oct. 1956.

Primary Examiner—Herbert Goldstein
Attorney, Agent, or Firm—Woodhams, Blanchard and Flynn

[57] ABSTRACT

A testing apparatus for measuring quickly the thermal behaviors of thermoplastic synthetic filament yarns comprising a pair of upper and lower rods for holding a specimen of the filament yarn and a tube heater for heating the specimen at predetermined temperatures which tube heater is arranged coaxially with the said rods so as to be relatively movable to position the specimen and the rods therein, the said heater being provided with a means (e.g., spiral resistor) for keeping the temperature constant and uniform, a forced cooling means (e.g., air-cooling blower) and a controlling means for controlling the rate of increase of the temperature (e.g., temperature controller) thereby enabling quick response of the heater. The testing apparatus further comprises a twister and a preextension regulator.

20 Claims, 6 Drawing Figures

X-Y RECORDER 25

TEMPERATURE CONTROLLER 29

TESTING APPARATUS FOR MEASURING THERMAL BEHAVIORS OF FILAMENT YARN

This invention relates to a testing apparatus for measuring physical and thermal properties of a filament yarn, and more particularly, to a testing apparatus for measuring or determining heat-treatment conditions and heatset characteristics of a thermoplastic synthetic filament yarn.

Generally, filament yarns or textile articles composed thereof (woven, non-woven, knitted fabrics, etc.) are subjected to heat treatment while undergoing any stress, tension or constraint during the process steps from the production of the filaments to completion of the textile articles. The thermal or mechanical characteristics of the filament yarns vary remarkably depending upon the conditions of heat treatment, e.g., tension, treating temperature and treating time. Notably, thermoplastic synthetic filament yarns are subjected to integrated heat treatments, where they are being processed into final articles. The preparation of final articles involves a series of steps including the production of raw filaments, i.e., spinning, drawing, twisting or the like at the beginning, subsequent weaving or knitting, and final dyeing and finishing. The processing conditions at the individual steps described above determine practically the qualities, performances, commercial values and productivities of the final textile articles. This fact is a well-known problem and is encountered by any textile engineer.

Representative physical properties of filament yarns which influence largely or are most concerned with those above-mentioned characteristics of the final articles are, in general, divided roughly into mechanical properties and thermal properties. Many test or examination methods have been proposed for testing tensile strength, elongation at break, crimp elasticity, thermal shrinkage magnitude, thermal shrinkage temperature and the like. Since the advent of thermoplastic synthetic fibers, however, the thermal properties have been regarded as most important.

Among the thermal properties, the magnitude of thermal shrinkage and the thermal shrinkage temperature are, in general, known and recognized to be an index or measure for estimating the dimensional stability of filament yarns. Both these properties are determined by measuring a dimensional change difference and dimensional change index before and after a heat treatment of a filament yarn. The heat treatment is effected in a suitable thermal medium for individual filament yarn which is under no tension or a definite load. An index of dimensional stability is obtained as a function of heating temperature. Furthermore, the thermal shrinkage magnitude and thermal shrinkage temperature have meaning not only as an index of the dimensional stability to heat of the filament yarns or textile articles composed thereof, but also give an important means of estimating or making an assumption about the physical structures of the filament yarns and changes thereof.

However, even if the thermal shrinkage magnitude and the thermal shrinkage temperature can be measured, the filament yarns during their production process are frequently subjected to heat treatment under a complicated combination of various constraint conditions. A consequence thereof is that in order to decide about practical appropriate processing conditions, much trouble and time are required to determine the foregoing properties and/or experiential knowledge and sensing elements must be relied upon.

In the well-known testing apparatuses for measuring the thermal properties, the most representative apparatus comprises a big constant temperature box and a tensile tester, of which the sample grasping part is inserted in the constant temperature box. In this apparatus, it was impossible to carry out quick measurements at predetermined temperatures because it took too much time for the constant temperature box to reach the operating temperatures because of its big heat capacity. It was merely possible to measure the mechanical properties of a specimen taking a sufficient period of time to reach predetermined temperature.

In the practical processings of filament yarns, e.g., false twisting, the filament yarns are subjected to a heat treatment in a very short time of the order of one second or so, under various levels of tension and various levels of twist count, and therefore, the prior art apparatus as described above cannot meet practical requirements at all.

In view of the practical processing conditions, a testing apparatus by which it is possible to carry out rapid measurements at predetermined various elevated temperatures under various conditions which may be simply and exactly reproduced in the apparatus, has been long earnestly desired. Further, an apparatus which can be applied to measure quickly and promptly thermal behaviors, at various elevated temperatures, of a filament yarn specimen being subjected to heat treatment has also been demanded and desired in the textile industry, because the behaviors, at various elevated temperatures, of the filament yarn specimen being heat treated can develop a reproducible characteristic curve of thermal hysteresis peculiar to the individual filament yarn. This is exceedingly helpful and useful in tracing the causes or reasons for defects in qualities such as a barre mark, a tight pick and uneven dyeing of processed filament yarns or textile articles composed thereof or in tracing and estimating under what conditions commercial filament yarns or textile articles are processed or treated.

Accordingly, an object of the invention is to provide a testing apparatus with which it is possible to determine quickly and promptly both thermal behaviors under various constraint conditions and mechanical properties after various heat treatments of specimens of thermoplastic synthetic filament yarns.

Another object of the invention is to provide a testing apparatus with which it is possible to determine or measure quickly and promptly thermal behaviors, at various predetermined temperatures, of specimens of thermoplastic synthetic filament yarns under various constraint conditions, which apparatus take a short period of time to reach the predetermined temperatures.

The invention has as a more concrete object to provide a testing apparatus having a tensile tester and provided also with a twisting mechanism, with which tester it is possible to determine thermal behaviors of thermoplastic synthetic filament yarns by reproducing various processing conditions, e.g., various levels of tensile strength, various levels of twist count or the like.

Additional objects will appear from the description made hereinafter.

According to the invention, one of the essential features for attaining the above objects resides in a testing apparatus in which a heater for heating a filament yarn specimen is arranged coaxially with a pair of coaxial upper and lower rods for holding the specimen, with the position of the said heater being relatively movable with respect to the specimen, and further, the said heater has a construction that is rapidly responsive to heating or cooling and actuates the heater to heat a fiber specimen at a suitable velocity, as specified hereinafter.

Another feature of the invention consists in that the testing apparatus having the construction described above is further provided with a twisting mechanism for measuring thermal properties of a filament yarn specimen at various levels of twist count.

Other features of the invention will be elucidated in the accompanying drawings and embodiments described hereinafter, but it is to be understood, of course that the invention is not limited to the illustrated embodiments but various modifications or alterations thereof can be made without departing from the scope of the invention.

Now, reference is made to the accompanying drawings in which.

Figure 1:
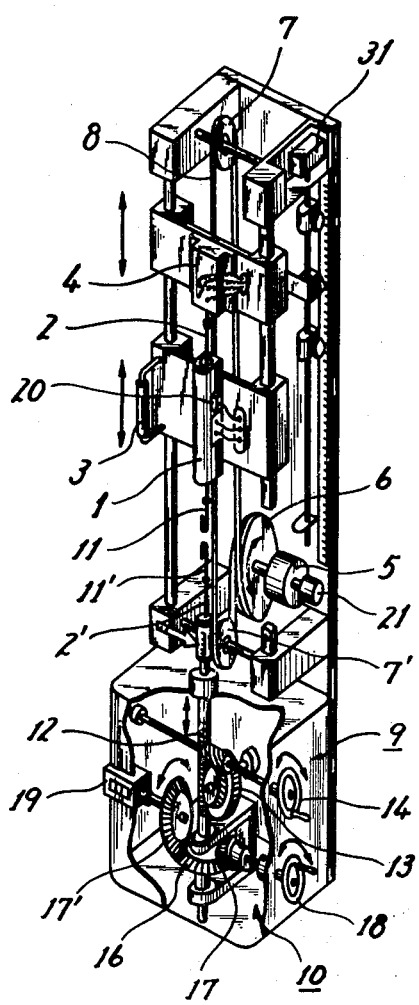
FIG. 1 is a perspective view showing one embodiment of the testing apparatus according to the invention.

Referring to FIG. 1, a tube heater 1 is formed in a hollow tube shape and is heated by electric current flowing therethrough. The flow of electric current is regulated by a voltage regulator (not shown) and phase control to control the rate at which the temperature inside the heater rises. The position of the said heater can be adjusted by sliding same up and down in the axial direction by a handle 3 so that the heater tube 1 can be positioned surrounding specimens during tests and can be moved to a position above the specimen when the tests are completed. An upper rod 2 for holding the upper end of a specimen is positioned coaxial with the central axis of the heater 1. The rod 2 is suspended from a load electric converter or transducer 4 such as a strain gauge. The said load electric converter 4 is fixed to an endless tape 8 which extends around a pair of guiding pulleys 7, 7' and also around a pulley 6 which is driven by a reversible motor 5. The tape 8 is movable up and down at a constant speed in conformity with the rotation of the said motor 5. A lower rod 2' for holding the lower end of the specimen is positioned coaxial with and below the rod 2, whereby the specimen can be held between the upper rod 2 and the lower rod 2'. The lower end of the rod 2' is connected to an initial load (preextension) regulating device 9 and a twisting device 10 which will be described hereinafter. The rods 2, 2' are provided with hooks 11, 11' for holding the opposite ends of a specimen. It is required that said rods 2, 2' and said hooks 11, 11' are made of a material having good heat resistance and dimensional stability, such as a rigid bar of phosphor-bronze alloy.

Figure 2:
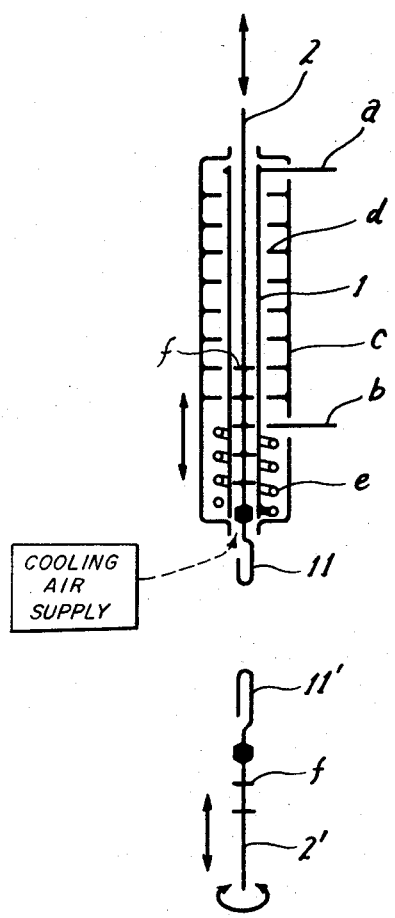
FIG. 2 is a schematic view showing the internal construction of a heater to be used in the testing apparatus of the invention in relation to the rods for holding a specimen.

In FIG. 2, the detailed inner structure of the heater to be used in the testing apparatus of the invention is illustrated.

The said heater 1 comprises a thin tube body which conducts directly an electric current, and is provided with an air-cooling blower which is actuated when cooling is required. The upper end of the tube body 1 is welded to a metallic terminal $a$ and the lower portion of the tube body is surrounded by a concentric spiral resistor $e$ extending over a suitable portion of its longitudinal length. The upper end of the resistor $e$ is welded to a terminal $b$ and the lower end thereof is welded to the lower end of the tube heater 1. The heater tube body 1 and the resistor $e$ are therefore connected in series between the terminals $a$ and $b$ so that electric current flows therethrough in series. The tube 1 thereby heats the specimen and the resistor $e$ supplies additional heat at the lower portion of the heater 1. This arrangement is effective for making the temperature more uniform in the axial direction of the heater.

Thus, the heater 1 having the above-mentioned structure has the advantage that the time required to elevate the temperature or cool is very short. The double heat supply in the lower portion of the heater can compensate for the heat lost from the lower portion caused by convection currents. Further, the said spiral resistor $e$ can absorb the stress generated by expansion of the heater 1, so that a thin tube of low strength can be used. If required, there can also be provided a heater cover $c$, a plurality of fins $d$ on the inner side of the said cover and in the region of the upper portion of the tube, and fins $f$ on the rods 2, 2', thereby to minimize convection inside the heater and thus making it possible to keep temperature throughout the axial length of the heater uniform and constant.

Next, the initial load or preextension regulating device 9 will be described with reference to FIG. 1. In FIG. 1, a rack 12 of a suitable length is positioned below the rod 2' and is meshed with a gear 13 fitted on a frame (not shown.) The gear 13 is coupled through a reduction gear to a handle 14. When the handle 14 is rotated in a clockwise direction, the rack 12 moves down and thereby the rod 2' moves down to apply a tension on a test specimen 15 held between the hooks 11, 11'. When the handle 14 is rotated counterclockwise the rod 2' moves up to release the tension on the specimen 15. In this way the specimen can be applied with a predetermined initial load (preextension).

The twisting device 10 is, as shown in FIG. 1, arranged below the said initial load regulating device 9. In the twisting device, a bevel gear 16 is joined to the rod 2' and is meshed with opposite bevel gears 17, 17'. The bevel gear 17 is fitted with a handle 18 through its shaft and the bevel gear 17' is connected to the input shaft of a counter 19. The bevel gear 16 has the same number of teeth as the bevel gear 17'. These members are supported, as a whole, with a support 10 for the rod 2'. When the handle 18 is rotated, the bevel gear 17 rotates and the bevel gear 16 rotates, whereby the rod 2' is rotated round its axis. At the same time, the bevel gear 17' is rotated or moved angularly about its axis to the same extent as the rod 2', and this is indicated on the counter 19.

Figure 3:
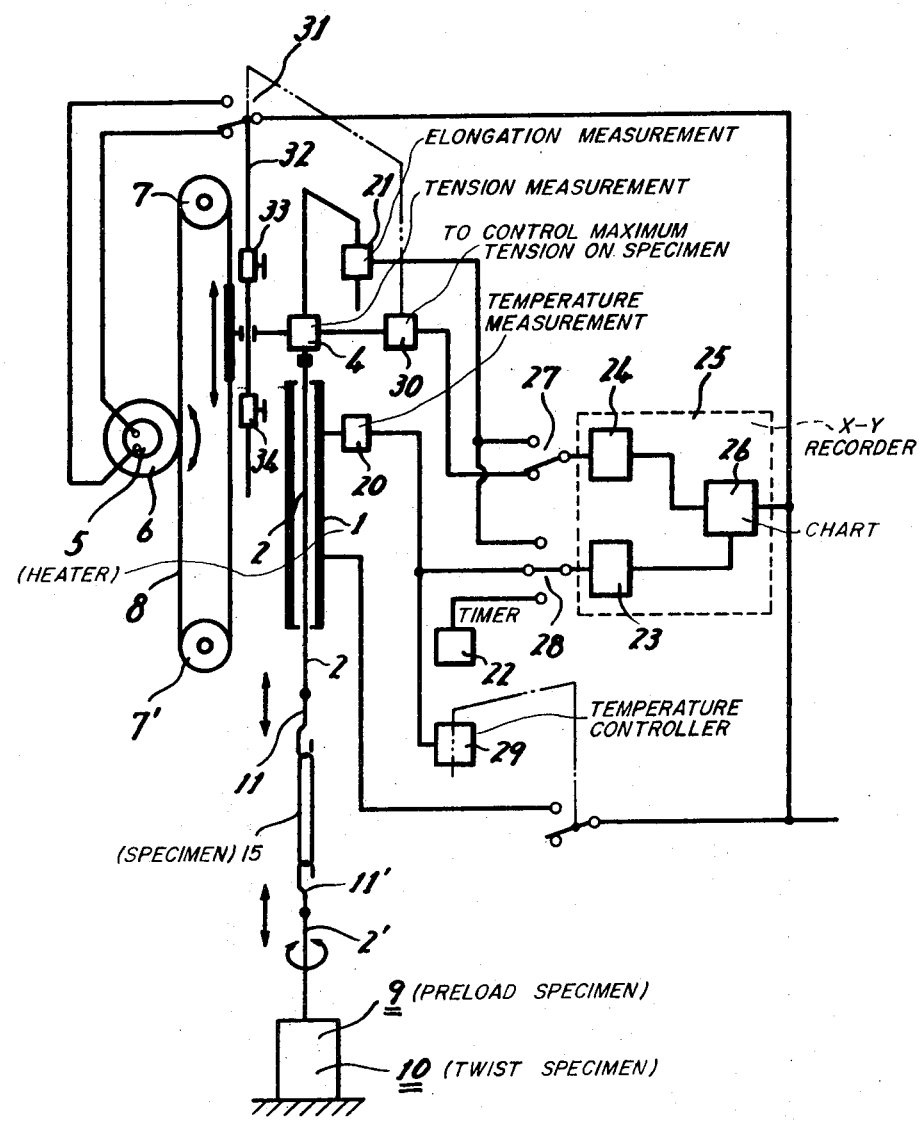
FIG. 3 is a system diagram showing the function or operation of the testing apparatus of the invention.

In FIG. 3 one embodiment of the system diagram of the testing apparatus, particularly its measurement system, according to the invention is illustrated. The load electric converter 4 mounted on the top of the upper rod 2 serves to measure the tension applied to the specimen 15. In connection with the load electric converter 4, there is a load regulation controller 30, which is constructed and arranged so that when the dial of the load setting adjustor in the said controller is adjusted to a predetermined load, the switch of the controller is switched when the input signal from the converter 4 is higher than the signal corresponding to a predetermined load. The said switch is also connected to an armature of a limit switch 31 described hereinafter, so that repeated tensile tests at a definite maximum load can be performed. The tension so applied to the specimen 15 can be read on the indicator of the controller 30.

In the neighborhood of the center of the heater 1, a thermoelectric converter 20 such as thermocouple is provided to measured the temperature of the heater 1. Further, the displacement distance of the said load electric converter 4 is measured on an electro displacement converter 21 such as a potentiometer. These two measured signals and the signal from a timer electric converter 22 are transmitted to the input of a conventional type of a X-Y recorder 25 which comprises conventional amplifiers 23, 24 having the functions of zero point adjustment and of variation of amplification degree, and the signals are recorded on a recording section 26. The X-Y recorder 25 generally operates as follows: When two signals are transmitted to the inputs of the X-Y recorder, the feeding amount of a recording paper is controlled in proportion to the magnitude of the one signal, while the displacement of a pen in the vertical direction to the feeding direction of the paper is controlled in proportion to the magnitude of the other signal, whereby a graph indicating one signal as the abscissa and the other signal as the ordinate of the said recording paper is drawn.

Figures 4, 5:
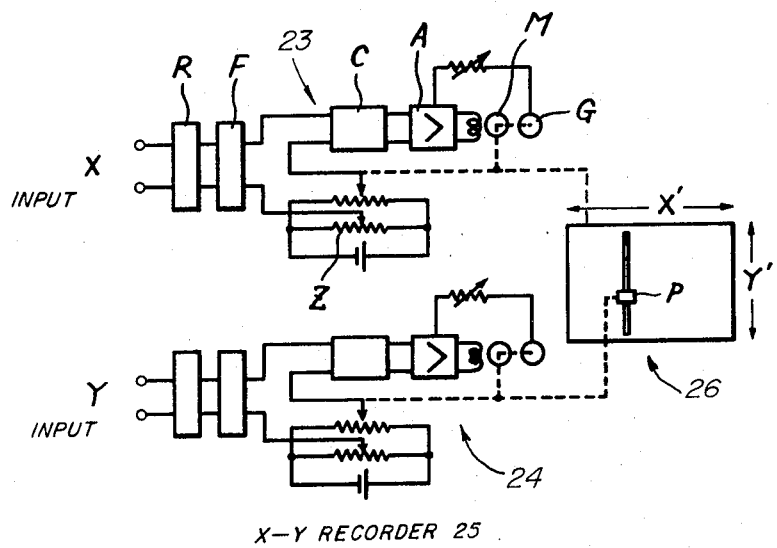
FIG. 4 is a block diagram of a X-Y recorder which may be used in the testing apparatus of the invention.
FIG. 5 is a block diagram of a temperature controller which may be used in the testing apparatus of the invention.

The schematic electrical system of the said X-Y recorder 25 is, for example, illustrated in FIG. 4. In FIG. 4, the alphabetical reference characters represent the following members: X : X-coordinate input; Y : Y-coordinate input; R : record selector; F : filter; C : converter; A : amplifier; M : balancing meter; G : tachogenerator; P : pen; and Z : zero point adjuster.

In the X-Y recorder 25 used in the testing apparatus of the invention, a signal showing the tension of the specimen, as measured by the load electric converter 4 and a signal showing elongation of the specimen, as measured by the electro displacement converter 21 are connected to the input of the amplifier 24 for the Y coordinate. A selection between both signals is made by means of a change-over switch 27 positioned ahead of the amplifier 24. On the other hand, a signal indicating elongation of the specimen, as measured by the electro displacement converter 21, a signal indicating temperature of the heater, as measured the thermo electric converter 20, and a signal indicating elapsed time, as measured by the timer electric converter 22, are connected to the input of the amplifier 23 for the X-coordinate. The selection of one signal from among these signals may be made with a change-over switch 28 located ahead of the amplifier 23. In order to keep the temperature of the heater 1 constant, a temperature controller 29 is connected to the said thermo electric converter 20. The schematic electrical system of the temperature controller 29 is, for example, shown in FIG. 5 wherein the alphabetical reference characters represent the following members:

I : input terminal; O : output terminal; F : filter; A' : amplifier; O' : output controlling circuit; C' : output controller; and S : set adjuster.

When the dial of the temperature controller 29 is adjusted to a predetermined temperature, the switch in the controller is switched to an "off" position by an input signal indicating a measured temperature the signal higher than the said predetermined temperature. Thus, it is possible to maintain constant temperature of the heater 1 by connecting the said switch to the circuit of the heater.

Having thus described the construction of the testing apparatus of the invention, now description will be made of the way operating the apparatus:

1. Preparation of a specimen:

After cutting a specimen of a filament yarn in a suitable length so as not to cause a strain thereof if possible, the ends of the specimen are joined together to form a loop and the loop-like specimen 16 is hung on the hooks 11, 11'.

2. Regulation of initial load (preextension):

In the tests of tensile strength of fine, delicate materials such as filament yarns, one of the most important things is, in general, to make the initial load applied to the specimen constant in order to enhance the of the test results reproducibility. In the testing apparatus of the invention, the initial load on the specimen 15 is changed by moving up and down the lower rod 2' by rotation of the handle 14 of the initial load regulating device 9 to apply a predetermined tension. Here, when the change-over switch 27 is connected to the load electric converter 4 as shown in FIG. 3, the tension is preliminarily corrected, and the corrected magnitude is indicated as a displacement of the pen of the X-Y recorder 25 or on an indicator of the load controller 30. Accordingly, the foregoing operation may be easily conducted while watching the displacement of the recording pen of the X-Y recorder 25 or the indicator of the load controller 30.

3. Simple tensile test:

When the reversible rotatable motor 5 is operated, the load electric converter 4 fixed on the tape 8 and the upper rod 2 holding the upper end of the specimen moves up and the specimen 15 is elongated. At this time, the change-over switch 28 is connected to the electro displacement converter 21 and the change-over switch 27 is connected to the load electric converter 4. Thus, a diagram showing a load-elongation curve is depicted on the recording paper of the X-Y recorder 25.

4. Repeated tension test:

Above the endless tape 8, there is positioned the limit switch 31 from the armature of which there is suspended a rod 32. The rod 32 is provided with two upper and lower stops 33, 34, whose positions are adjustable appropriately. When the reversibly rotatable motor 5 is normally rotated (clockwise), the load electric converter 4 moves up a predetermined distance and then engages the upper stop 33, which pushes the rod 32 up and actuates the limit switch 31 to connect the reverse circuit of the reversibly rotatable motor 5. Then, the load electric converter 4 moves down by the reverse rotation of the motor until it engages the lower stop 34, which returns the limit switch 31 to its original position and transfers the circuit for normal rotation. Accordingly, by adjusting the positions of the both stops 33, 34 appropriately, a diagram showing a load - elongation curve at repeated definite elongation can be obtained.

5. Measurement of contraction stress by twisting:

After a specimen is set between the hooks 11, 11', the handle 18 of the twisting device 10 is rotated at a constant speed. At this time, the change-over switch 27 is connected to the load electric converter 4 and the change-over switch 28 is connected to the timer electric converter 22, whereby the variation of contraction stress corresponding to the variation in twist count may be known.

6. Adjustment of temperature of the heater:

The heater 1 is beforehand raised to the uppermost position, while the dial of the temperature controller 29 is adjusted at a predetermined temperature. Then the heater is turned on, and soon the temperature controller 29 is actuated to keep the said temperature of the heater constant. At that time, the heater 1 is pushed down to insert the specimen 15 in the hollow part thereof. Having thus prepared, the tests described in the preceding paragraphs may be performed, and mechanical properties of the specimen in a high temperature atmosphere may be known.

7. Measurement of thermal stress during heating and cooling process:

After the heater 1 is beforehand pushed down and the specimen 15 of constant length is inserted in the hollow part of the heater, the heater is turned on. At that time, the change-over switch 27 is connected to the load electric converter 4 and the change-over switch 28 is connected to the thermo electric converter 20, whereby the variation of contraction stress generated on the specimen of constant length can be observed corresponding to the variation in temperature accompanied with heating. When the heater is switched off in this state of the connection, the variation of contraction stress corresponding to the variation in temperature on cooling can be known.

8. Self-evidently, it is possible to carry out various measurements by various other combinations of the signals, in addition to the tests explained in the foregoing paragraphs.

Figure 6:
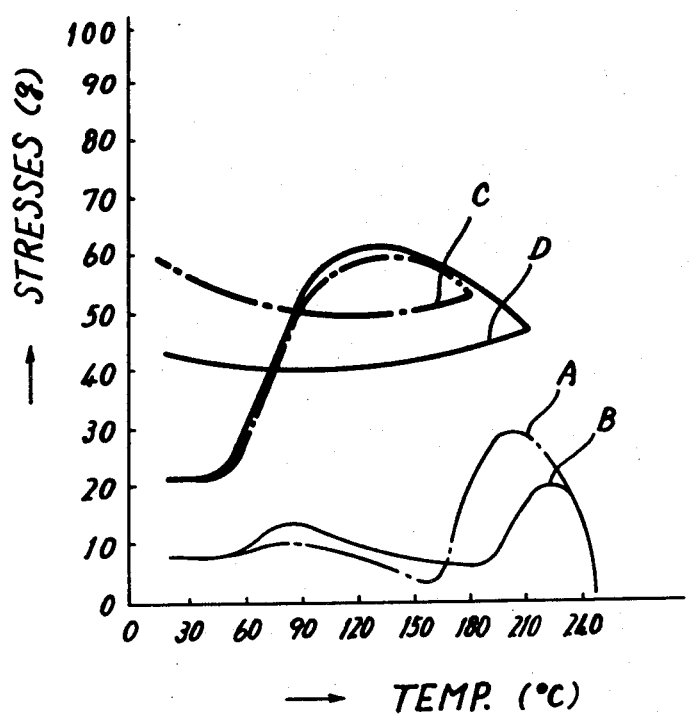
FIG. 6 is a diagram of characteristic curves of thermal stress showing one example of the results obtained by measurement using the testing apparatus of the invention.

It should be noted that according to the testing apparatus of the invention, thermal properties of the specimen before, during and after heat treatment may be investigated. For example, characteristic curves on the thermal properties of a polyester drawn yarn and of a polyester false-twisted yarn are shown in FIG. 6. The curves were obtained as follows: A specimen of a polyester drawn yarn of constant length is set between the hooks 11, 11', twisted intensely with the twisting device 10 and subsequently inserted in the heater 1. With the heater, the specimen is heated at a regular speed of temperature elevation from 180° to 200° C and then cooled. The diagrams showing temperature - contraction stress relation on heating and cooling so obtained are indicated in the curves C and D, respectively in FIG. 6. Further, the said specimen is thereafter untwisted to a false-twisted yarn by reverse rotation of the twisting device 10. The false-twisted yarn is applied with an initial load adjusted to an extent that the crimps of the yarn do not disappear, set in a constant length between the hooks and heated at a regular elevating speed of 225° C/60 sec. up to a temperature at which specimen melts. Thus-obtained diagrams showing temperature - contraction stress relation are indicated in the curves A, B in FIG. 6. Therefore, it may be possible to decide theoretically the optimal temperature for thermal treatments in a false-twist processing by analyzing these four curves. This possibility, of course, applies to general cases for deciding the optimal temperature for thermal treatments in the processings of synthetic filament yarns.

In accordance with the testing apparatus of the invention as described above, there are mentioned many advantages that it is possible to determine easily and simply the thermal properties, mechanical properties and combinations thereof on a synthetic filament yarn to illustrate them evidently on graphs or diagrams; particularly, it is possible to measure the thermal and mechanical properties of a synthetic filament yarn accurately and in a short time since quick and prompt heat treatment up to predetermined temperatures is possible; and it is possible to analyze precisely and in detail co-relations between those properties after, during and before heat treatment since the specimen already heat-treated with the apparatus may be directly undergone the subsequent tests without being taken off from the apparatus. On the contrary, according to the prior art tester the sort of the analyzation has been never possible. Accordingly, the testing apparatus of the invention serves for laboratory workers and plant engineers.

What is claimed is:

1. A testing apparatus for measuring thermal behavior of synthetic resin filament yarn, which comprises:
   an elongated, hollow, heating tube made of electrically conductive material and whose central opening defines an elongated heating zone which is open at its opposite ends;
   means for flowing electrical current at a controlled rate through the wall of said heating tube to generate heat therein and thereby maintain a selected temperature in the tube;
   means supporting said heating tube for movement in a direction lengthwise of the axis of said central opening;
   a pair of hooks which are coaxial with each other and with the axis of said central opening, said hooks being spaced apart a distance less than the axial length of said zone, said hooks being adapted to engage the opposite ends of a loop-like specimen of yarn, said hooks being of smaller transverse size than said tube so that said hooks can be entirely received within said tube and can move outside of said tube when said tube is moved along said axis relative to said hooks;
   first measuring means connected to one of said hooks for measuring the tension of said specimen at a fixed elongation of said specimen and providing an electrical signal indicative of said tension;
   twisting means connected to the other of said hooks for rotating same about the axis thereof thereby to twist the specimen;
   second measuring means for measuring the temperature of the heating tube and providing an electrical signal indicative of said temperature;

third measuring means for measuring time and providing an electrical signal indicative of time;

an X-Y recorder for providing a graphical indication in response to two input signals and means for supplying an electrical signal from said first measuring means as one input to said recorder and means for selectively supplying an electrical signal from either said second or said third measuring means as the second input to said recorder.

2. A testing apparatus according to claim 1, including means for supplying cooling air into said tube.

3. A testing apparatus according to claim 1, in which said twisting means comprises gearing connected to rotate said other hook about the longitudinal axis of the specimen, a manually operable handle for operating said gearing and an indicator for indicating the amount of twisting movement imparted to said other hook.

4. A testing apparatus according to claim 1, in which said tube is upright and has an electrical terminal connected to the upper end thereof, a spiral electrical heating element encircling the lower portion of said tube and extending partway along said tube, the lower end of said heating element being electrically connected to the lower end of said tube and a second electrical terminal connected to the upper end of said heating element so that electrical current flows in series through said tube and said heating element.

5. A testing apparatus according to claim 4, in which said hooks have fin means located above and below the ends of the specimen and adapted to substantially occupy the entire cross-section of the central opening of the tube to minimize convection therein.

6. A testing apparatus for measuring thermal behavior of synthetic resin filament yarn, which comprises:

an elongated, hollow, heating tube made of electrically conductive material and whose central opening defines an elongated heating zone which is open at its opposite ends;

means for flowing electrical current at a controlled rate through the wall of said heating tube to generate heat therein and thereby maintain a selected temperature in the tube;

means supporting said heating tube for movement in a direction lengthwise of the axis of said central opening;

a pair of hooks which are coaxial with each other and with the axis of said central opening, said hooks being spaced apart a distance less than the axial length of said zone, said hooks being adapted to engage the opposite ends of a loop-like specimen of yarn, said hook being of smaller transverse size than said tube so that said hooks can be entirely received within said tube and can move outside of said tube when said tube is moved along said axis relative to said hooks;

tension applying means comprising a reversible drive unit connected to one of said hooks for moving same axially in a first direction away from said specimen thereby to apply tension to a specimen, means for reversing the direction of movement of said drive unit in response to a predetermined elongation of said specimen to remove tension and means for again moving said drive unit in said one direction in response to a predetermined reverse movement of said drive unit so that the specimen can be repeatedly tensioned to a predetermined elongation;

first measuring means for measuring the tension applied to said specimen and providing an electrical signal indicative of said tension;

second measuring means for measuring the elongation of the specimen and providing an electrical signal indicative of said elongation;

an X-Y recorder for providing a graphical indication in response to two input signals and means for supplying electrical signals from said first and second measuring means as inputs to said recorder.

7. A testing apparatus according to claim 6, which further comprises twisting means connected to one of said hooks for twisting the specimen about its longitudinal axis.

8. A testing apparatus according to claim 7, in which said tension applying means is connected to one of said hooks and said twisting means is connected to the other of said hooks.

9. A testing apparatus according to claim 8, in which said twisting means comprises gearing connected to rotate said other hook about the longitudinal axis of the specimen, a manually operable handle for operating said gearing and an indicator for indicating the amount of twisting movement imparted to said other hook.

10. A testing apparatus according to claim 6, in which the other of said hooks has a static tension applying means connected thereto to initially tension the specimen.

11. A testing apparatus according to claim 10, in which said static tension applying means comprises gearing for moving said other hook longitudinally and manually operable means for operating said gearing, said reversible drive unit comprising a reversible motor and means driven by said motor for reversibly moving said one hook axially.

12. A testing apparatus according to claim 11, including switch means operable in response to preselected movements of said one hook in opposite longitudinal directions for reversing operation of said motor.

13. A testing apparatus according to claim 6, including means for measuring the temperature of said tube.

14. A testing apparatus according to claim 6, including means for supplying cooling air into said tube.

15. A testing apparatus according to claim 6, in which said tube is upright and has an electrical terminal connected to the upper end thereof, a spiral electrical heating element encircling the lower portion of said tube and extending partway along said tube, the lower end of said heating element being electrically connected to the lower end of said tube and a second electrical terminal connected to the upper end of said heating element so that electrical current flows in series through said tube and said heating element.

16. A testing apparatus according to claim 15, in which said hooks have fin means located above and below the ends of the specimen and adapted to substantially occupy the entire cross-section of the central opening of the tube to minimize convection therein.

17. A testing apparatus for measuring thermal behavior of synthetic resin filament yarn, which comprises:

an elongated, hollow, heating tube made of electrically conductive material and whose central opening defines an elongated heating zone which is open at its opposite ends;

means for flowing electrical current at a controlled rate through the wall of said heating tube to generate heat therein and thereby maintain a selected temperature in the tube;

means supporting said heating tube for movement in a direction lengthwise of the axis of said central opening;

a pair of hooks which are coaxial with each other and with the axis of said central opening, said hooks being spaced apart a distance less than the axial length of said zone, said hook being adapted to engage the opposite ends of a loop-like specimen of yarn, said hooks being of smaller transverse size than said tube so that said hooks can be entirely received within said tube and can move outside of said tube when said tube is moved along said axis relative to said hooks;

tension applying means connected to one of said hooks for moving same axially thereby to apply tension to a specimen;

twisting means connected to the other of said hooks for rotating same about the axis thereof thereby to twist the specimen;

first measuring means for measuring the tension applied to said specimen and providing an electrical signal indicative of said tension;

second measuring means for measuring the temperature of the heating tube and providing an electrical signal indicative of said temperature;

third measuring means for measuring the elongation of the specimen and providing an electrical signal indicative of said elongation;

fourth measuring means for measuring time and providing an electrical signal indicative of time;

an X-Y recorder for providing a graphical indication in response to two input signals and means for selectively supplying electrical signals from two of said measuring means as inputs to said recorder.

18. A testing apparatus according to claim 17, in which said twisting means comprises gearing connected to rotate said other hook about the longitudinal axis of the specimen, a manually operable handle for operating said gearing and an indicator for indicating the amount of twisting movement imparted to said other hook.

19. A testing apparatus according to claim 17, including means for supplying cooling air into said tube.

20. A testing apparatus according to claim 17, in which said tension applying means comprises a reversible motor and means driven by said motor for reversibly moving said one hook axially, and a second manually operable static tensioning means connected to the other hook for moving same axially to preload the specimen.

* * * * *